US012396478B2

(12) United States Patent
Mironov

(10) Patent No.: US 12,396,478 B2
(45) **Date of Patent: *Aug. 26, 2025**

(54) AEROSOL-FORMING ARTICLE COMPRISING MAGNETIC PARTICLES

(71) Applicant: Philip Morris Products S.A., Neuchatel (CH)

(72) Inventor: Oleg Mironov, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,760

(22) Filed: May 20, 2024

(65) Prior Publication Data

US 2024/0306705 A1 Sep. 19, 2024

Related U.S. Application Data

(63) Continuation of application No. 17/139,396, filed on Dec. 31, 2020, now Pat. No. 12,016,375, which is a (Continued)

(30) Foreign Application Priority Data

May 21, 2014 (EP) .................................... 14169238

(51) Int. Cl.
*A24F 13/00* (2006.01)
*A24D 1/20* (2020.01)
(Continued)

(52) U.S. Cl.
CPC ................ *A24D 1/20* (2020.01); *A24F 40/46* (2020.01); *A24F 40/465* (2020.01); *A24F 40/50* (2020.01);
(Continued)

(58) Field of Classification Search
CPC ....................................................... A24F 47/00
(Continued)

(56) References Cited

U.S. PATENT DOCUMENTS 4,258,730 A 3/1981 Tsukamoto
5,060,671 A 10/1991 Counts et al.
(Continued)

FOREIGN PATENT DOCUMENTS

CN 1043250 A 6/1990
CN 1122462 5/1996
(Continued)

OTHER PUBLICATIONS

International Search Report and Written Opinion issued Sep. 11, 2015 in PCT/EP2015/061184 filed May 20, 2015.
(Continued)

*Primary Examiner* — Phuong K Dinh
(74) *Attorney, Agent, or Firm* — Oblon, McClelland, Maier & Neustadt, L.L.P.

(57) ABSTRACT

An aerosol-forming article for an electrically heatable aerosol-generating device is provided, the aerosol-forming article including: a mouthpiece; an aerosol-forming substrate disposed in coaxial alignment with the mouthpiece; a plurality of magnetic particles; and an outer wrapper, in which a plurality of magnetic particles are provided in the outer wrapper; or a filter, in which a plurality of magnetic particles are provided in the filter.

14 Claims, 1 Drawing Sheet

Related U.S. Application Data continuation of application No. 16/567,816, filed on Sep. 11, 2019, now Pat. No. 10,959,463, which is a continuation of application No. 16/040,218, filed on Jul. 19, 2018, now Pat. No. 10,463,080, which is a continuation of application No. 15/311,629, filed as application No. PCT/EP2015/061184 on May 20, 2015, now Pat. No. 10,159,283.

(51) Int. Cl.
*A24F 40/46* (2020.01)
*A24F 40/465* (2020.01)
*A24F 40/50* (2020.01)
*H05B 6/06* (2006.01)
*H05B 6/10* (2006.01)
*A24F 40/20* (2020.01)

(52) U.S. Cl.
CPC ............... *H05B 6/06* (2013.01); *H05B 6/106* (2013.01); *H05B 6/108* (2013.01); *A24F 40/20* (2020.01); *H05B 2206/023* (2013.01)

(58) Field of Classification Search
USPC .................................................. 131/328–329
See application file for complete search history.

(56) References Cited

U.S. PATENT DOCUMENTS

| | | | | |
|---|---|---|---|---|
| 5,269,327 | A | 12/1993 | Counts et al. | |
| 5,378,879 | A | 1/1995 | Monovoukas | |
| 5,388,594 | A | 2/1995 | Counts et al. | |
| 5,396,911 | A | 3/1995 | Casey, III et al. | |
| 5,498,855 | A | 3/1996 | Deevi et al. | |
| 5,505,214 | A | 4/1996 | Collins et al. | |
| 5,514,630 | A | 5/1996 | Willkens et al. | |
| 5,591,368 | A | 1/1997 | Fleischhauer et al. | |
| 5,613,505 | A | 3/1997 | Campbell et al. | |
| 5,902,501 | A | 5/1999 | Nunnally et al. | |
| 7,997,280 | B2 | 8/2011 | Rosenthal | |
| 10,959,463 | B2 * | 3/2021 | Mironov | H05B 6/106 |
| 2004/0049297 | A1 | 3/2004 | Card et al. | |
| 2004/0149297 | A1 | 8/2004 | Sharpe | |
| 2004/0173229 | A1 | 9/2004 | Crooks et al. | |
| 2007/0235046 | A1 * | 10/2007 | Gedevanishvili | A24D 3/046 131/201 |
| 2008/0092912 | A1 | 4/2008 | Robinson | |
| 2012/0006343 | A1 * | 1/2012 | Renaud | A24B 15/165 131/194 |
| 2012/0234315 | A1 | 9/2012 | Li et al. | |
| 2014/0060554 | A1 | 3/2014 | Collett et al. | |
| 2014/0301721 | A1 * | 10/2014 | Ruscio | A24F 40/46 392/386 |
| 2018/0317561 | A1 | 11/2018 | Mironov | |

FOREIGN PATENT DOCUMENTS

| | | | |
|---|---|---|---|
| CN | 1126426 | A | 7/1996 |
| CN | 2279801 | Y | 4/1998 |
| CN | 1235794 | A | 11/1999 |
| CN | 1280661 | A | 1/2001 |
| CN | 1312038 | A | 9/2001 |
| CN | 1616562 | A | 5/2005 |
| CN | 1312038 | C | 4/2007 |
| CN | 201238287 | Y | 8/2009 |
| CN | 101862038 | A | 10/2010 |
| CN | 102264251 | A | 11/2011 |
| CN | 2504731 | A | 2/2014 |
| CN | 203424284 | U | 2/2014 |
| CN | 108634371 | | 10/2018 |
| EP | 0 277 519 | A3 | 8/1988 |
| EP | 0 893 071 | A1 | 1/1999 |
| EP | 0 857 431 | A4 | 9/1999 |
| EP | 1 128 741 | A1 | 9/2001 |
| EP | 1 439 876 | A2 | 7/2004 |
| EP | 1 238 594 | B1 | 9/2006 |
| EP | 1 736 065 | A1 | 12/2006 |
| EP | 1 750 788 | A1 | 2/2007 |
| EP | 1 736 062 | A3 | 4/2007 |
| EP | 1 618 803 | A4 | 9/2007 |
| EP | 2 444 112 | A1 | 4/2012 |
| EP | 2 609821 | A1 | 7/2013 |
| JP | 2001-118669 | A | 4/2001 |
| JP | 2003-76173 | A | 3/2003 |
| JP | 2004-55547 | | 2/2004 |
| JP | 2005-516357 | A | 6/2005 |
| JP | 2006-320286 | A | 11/2006 |
| JP | H08-511175 | A | 4/2008 |
| JP | 2009-531057 | | 9/2009 |
| JP | 2011-517567 | | 6/2011 |
| JP | 2011-519342 | | 7/2011 |
| JP | 2012-513750 | | 6/2012 |
| JP | 2013-509160 | | 3/2013 |
| JP | 7011684 | B2 | 1/2022 |
| KR | 10-0385395 | B1 | 8/2003 |
| KR | 10-2005-0099979 | | 10/2005 |
| KR | 10-0636287 | B1 | 10/2006 |
| KR | 10-2009-0008237 | A | 1/2009 |
| RU | 2 132 629 | C1 | 7/1999 |
| TW | 201345447 | A | 11/2013 |
| WO | 95/27411 | A1 | 10/1995 |
| WO | 99/20940 | A1 | 4/1999 |
| WO | WO 2003/095688 | A3 | 11/2003 |
| WO | WO 2004/043175 | A1 | 5/2004 |
| WO | WO 2004/095955 | A1 | 11/2004 |
| WO | WO 2007/024130 | A1 | 3/2007 |
| WO | WO 2007/066374 | A1 | 6/2007 |
| WO | WO 2007/131449 | A1 | 11/2007 |
| WO | WO 2007/131450 | A1 | 11/2007 |
| WO | WO 2007/132356 | A2 | 11/2007 |
| WO | WO 2011/160788 | A1 | 12/2011 |
| WO | WO 2013/060743 | A2 | 5/2013 |
| WO | WO 2013/067511 | A2 | 5/2013 |
| WO | WO 2013/120566 | A2 | 8/2013 |
| WO | WO 2014/048745 | A1 | 4/2014 |

OTHER PUBLICATIONS

Combine Russian Federation Office Action and Search Report issued on Aug. 27, 2018 in Patent Application No. 2016149880/12(080130) (with English translation), 8 pages.
Combined Chinese Office Action and Search Report issued on Jan. 22, 2019, in Patent Application No. 201580023039.8 (with English translation), 20 pages.
Japanese Office Action with English translation mailed on Jun. 6, 2019 in corresponding Japanese Patent Application No. 2016-568421, (5 pages).
Extended European Search Report mailed on Oct. 24, 2018 in corresponding European Application No. 18 18 1478, (8 pages).
Combined Chinese Office Action and Search Report issued on Aug. 26, 2019, in Patent Application No. 201580023039.8, 12 pages (with English translation and English Translation of Category of Cited Documents).
Combined Taiwanese Notice of allowance and Search Report issued on Feb. 24, 2020 in Patent Application No. 104114655 (with English translation), 5 pages.
Indian Examination Report issued on Mar. 11, 2020, in Patent Application No. 201617026872, 7 pages.
Extended European Search Report issued Jan. 13, 2021 in corresponding European Patent Application No. 20199396.1, 10 pages.
Japanese Office Action issued Apr. 15, 2021 in Japanese Patent Application No. 2020-116105 (with English translation), 10 pages.
Combined Chinese Office Action and Search Report issued Mar. 31, 2022 in corresponding Chinese Patent Application No. 202010029416.1 (with English Translation), 21 pages.
Korean Office Action issued May 17, 2022 in Korean Patent Application No. 10-2016-7029572 (with English translation), 9 pages.
Russian Office Action and Search Report issued Sep. 19, 2022 in Patent Application No. 2019115142/03(028850) (with English language translation), 16 pages.

(56) References Cited

OTHER PUBLICATIONS

Combined Chinese Office Action and Search Report issued Oct. 10, 2022 in Patent Application No. 202010516088.8 (with English language translation), 13 pages.
Notice of Reasons for Rejection issued Mar. 13, 2023 in Japanese Patent Application No. 2022-004105 (with English language translation), 7 pages.
Korean Office Action issued Sep. 20, 2023 in Korean Patent Application No. 10-2016-7029572 (with English Translation), 8 pages.
Korean Notice of Allowance mailed on Jan. 12, 2024 issue in Korean Patent Application No. 10-2016-7029572 filed on May 20, 2015, with English Translation, total 4 pages.
Korean Office Action mailed Jan. 15, 2024 issued in Korean Patent Application No. 2023-7014011, with English Translation, total 11 pages.
Chinese Notice of Allowance and Search Report mailed on Mar. 19, 2024, issued in Chinese Patent Application No. 202010516088.8 filed on May 20, 2015, with English Translation, total 8 pages.
Japanese Office Action issued Feb. 25, 2025, in corresponding Japanese Patent Application No. 2024-001664 (with English Translation), 9 pages.

* cited by examiner

AEROSOL-FORMING ARTICLE COMPRISING MAGNETIC PARTICLES

CROSS REFERENCE TO RELATED APPLICATIONS

This application is a continuation of and claims benefit under 35 U.S.C. § 120 to U.S. application Ser. No. 17/139,396, filed on Dec. 31, 2020, which is a continuation of and claims benefit under 35 U.S.C. § 120 to U.S. application Ser. No. 16/567,816, filed on Sep. 11, 2019 (now U.S. Pat. No. 10,959,463), which is a continuation of and claims benefit under 35 U.S.C. § 120 to U.S. application Ser. No. 16/040,218, filed on Jul. 19, 2018 (now U.S. Pat. No. 10,463,080), which is a continuation of and claims benefit under 35 U.S.C. § 120 to U.S. application Ser. No. 15/311,629, filed on Nov. 16, 2016 (now U.S. Pat. No. 10,159,283), which is a U.S. national stage application of PCT/EP2015/061184, filed on May 20, 2015, and claims benefit of priority under 35 U.S.C. § 119 from EP 14 169 238.4, filed on May 21, 2014, the entire contents of each of which are incorporated herein by reference.

TECHNICAL FIELD

The present invention relates to an aerosol-forming article for use in an electrically heated aerosol-generating system, the aerosol-forming article comprising magnetic particles comprising a magnetic material having a Curie temperature of between about 60 degrees Celsius and about 200 degrees Celsius. The present invention also relates to an electrically heated aerosol-generating device for receiving an aerosol-forming article, the device comprising an inductor and a heater element controlled in response to a measured inductance of the inductor. The present invention further relates to a method of operating the device in combination with the aerosol-forming article.

DESCRIPTION OF THE RELATED ART

A number of documents, for example U.S. Pat. Nos. 5,060,671, 5,388,594, 5,505,214, WO-A-2004/043175, EP-A-1 618 803, EP-A 1 736 065 and WO-A-2007/131449, disclose electrically operated aerosol-generating, smoking, systems having a number of advantages. One advantage is that they significantly reduce sidestream smoke, while permitting the smoker to selectively suspend and reinitiate smoking.

Electrically heated smoking systems typically include a power supply, such as a battery, connected to a heater to heat an aerosol-forming substrate, to form the aerosol which is provided to the smoker. In operation, these electrically heated smoking systems typically provide a high power pulse to the heater to provide the temperature range desired for operation and to release the volatile compounds. Electrically heated smoking systems may be reusable and may be arranged to receive a disposable smoking article, containing the aerosol-forming substrate, to form the aerosol.

Aerosol-generating, smoking, articles developed for electrically heated smoking systems are typically specially designed, because the flavours are generated and released by a controlled heating of the aerosol-forming substrate, without the combustion that takes place in lit-end cigarettes and other smoking articles. Therefore, the structure of a smoking article designed for an electrically heated smoking system may be different from the structure of a lit-end smoking article. Using a lit-end smoking article with an electrically heated smoking system may result in a poor smoking experience for the user, and may also damage the system because, for example, the smoking article is not compatible with the system. In addition, there may be a number of different smoking articles which are each configured for use with the system, but which each provide a different smoking experience for the user.

Some of the electrically heated smoking systems of the prior art include a detector which is able to detect the presence of a smoking article received in the smoking system. Typically, known systems print identifiable ink on the surface of the smoking article, which is then detected by the electrically heated smoking device. It is an object of the present invention to provide an improved aerosol-forming article, and an electrically heated aerosol-generating device including a detector which offers additional functionality to the consumer, and increased difficulty to produce counterfeit articles.

SUMMARY

Accordingly, the present invention provides an aerosol-forming article for use in an electrically heated aerosol-generating device, the aerosol-forming article comprising a mouthpiece, an aerosol-forming substrate and a plurality of magnetic particles comprising a magnetic material having a Curie temperature of between about 60 degrees Celsius and about 200 degrees Celsius.

BRIEF DESCRIPTION OF THE DRAWINGS

Embodiments will now be further described, by way of example only, with reference to the accompanying drawings in which.

DETAILED DESCRIPTION

Figure 1:
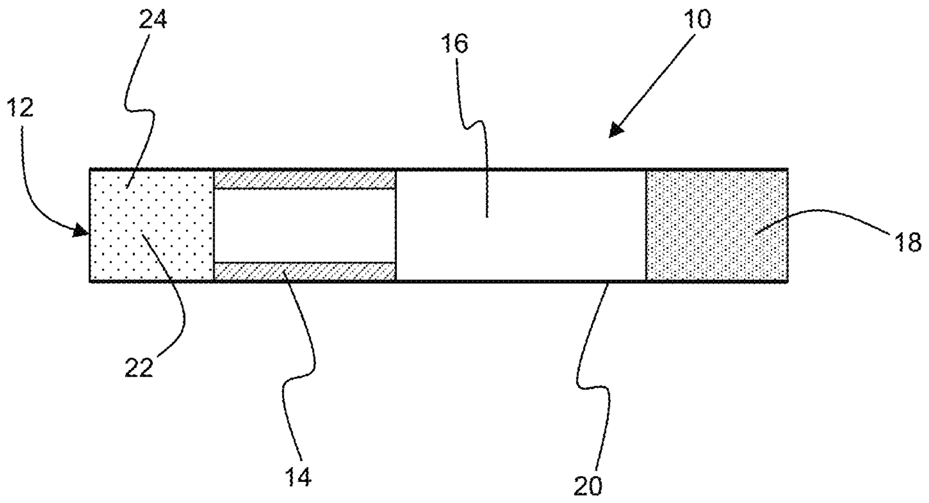
FIG. 1 shows an aerosol-forming article in accordance with an embodiment of the invention.

The term "aerosol-forming article" is used herein to mean an article comprising at least one substrate that forms an aerosol when heated. As known to those skilled in the art, an aerosol is a suspension of solid particles or liquid droplets in a gas, such as air. The aerosol may be a suspension of solid particles and liquid droplets in a gas, such as air.

By providing a plurality of magnetic particles on or within the aerosol-forming article, articles formed in accordance with the present invention advantageously provide a novel means for an electrically heated aerosol-generating device to detect the presence of the article. In particular, in use, the aerosol-forming article is received within an electrically heated aerosol-generating device which comprises means for detecting the presence of the magnetic particles. As discussed in more detail below, the means for detecting the presence of the magnetic particles preferably comprises an inductor provided in the device.

Advantageously, forming the magnetic particles from a magnetic material having a Curie temperature of between about 60 degrees Celsius and about 200 degrees Celsius can add a further element to the detection of aerosol-forming articles by the electrically heated aerosol-generating device. For example, the device can firstly detect the presence of an aerosol-forming article intended for use with the device by detecting the presence of magnetic particles within the aerosol-forming article. After initial heating of the aerosol-forming article the device can then detect a temperature at which the properties of the magnetic particles change, which indicates the Curie temperature of the magnetic material forming the magnetic particles. Based on the Curie temperature, the device can then perform a further action, such as implementing a particular heating profile depending on the type of aerosol-forming article that has been detected.

Therefore, preferably, the magnetic particles comprise a magnetic material having a Curie temperature that falls within the operating temperature of the electric heater in the electrically heated aerosol-generating device. The magnetic particles may comprise a magnetic material having a Curie temperature of at least about 70 degrees Celsius, preferably at least about 80 degrees Celsius. Additionally, or alternatively, the magnetic particles may comprise a magnetic material having a Curie temperature of less than about 140 degrees Celsius, preferably less than about 130 degrees Celsius.

The invention preferably provides two or more types of magnetic particle for use in the aerosol-forming article, each type of magnetic particle having a different Curie temperature. In this way, a plurality of aerosol-forming articles can be provided, each having a different type of magnetic particles to enable the aerosol-generating device to distinguish between the aerosol-forming articles based on the detected Curie temperature and operate accordingly.

Additionally, or alternatively, the invention may provide a plurality of aerosol-forming articles, each comprising a different amount of magnetic particles so that the aerosol-generating device can distinguish between the different types of aerosol-forming article based on the detected amount of magnetic particles and operate accordingly.

The magnetic particles may be incorporated into any component of the aerosol-forming article, including but not limited to: paper, such as wrapper paper; filters; tipping papers; tobacco; tobacco wraps; coatings; binders; fixations; glues; inks, foams, hollow acetate tubes; wraps; and lacquers. The magnetic particles may be incorporated into the component by either adding them during the manufacture of the material, for example by adding them to a paper slurry or paste before drying, or by painting or spraying them onto the component.

In some embodiments, it may be preferable to provide the magnetic particles in the aerosol-forming substrate, particularly in cases where the aerosol-forming article is used with an electrically heated aerosol-generating device comprising a heater and an inductor that are inserted into the aerosol-forming substrate during use. Providing the magnetic particles within the aerosol-forming substrate also prevents the particles from becoming dislodged during subsequent handling of the aerosol-forming article during manufacture and handling by the consumer.

Preferably, the magnetic particles are distributed throughout the aerosol-forming substrate so that the orientation of the aerosol-forming article within the aerosol-generating device is not important. This enables the use of the system to be simpler for the consumer. In a particularly preferred embodiment, the magnetic particles are substantially homogeneously distributed throughout the aerosol-forming substrate.

The magnetic particles are preferably present in an amount of between about 1 percent and about 30 percent by weight of the aerosol-forming substrate, more preferably between about 1 percent and about 10 percent by weight of the aerosol-forming substrate, most preferably between about 1 percent and about 5 percent by weight of the aerosol-forming substrate. Providing an amount of magnetic particles within these ranges ensures that they are present in sufficient numbers to enable effective detection by the electrically heated aerosol-generating device during use.

The number average diameter of the magnetic particles is preferably between about 25 micrometres and about 75 micrometres. Particles sizes within this range allow incorporation into the aerosol-forming article with minimal modification to existing manufacturing processes. For example, in embodiments in which the aerosol-forming substrate comprises tobacco wrapped in a cigarette paper, the magnetic particles can be added and mixed into the tobacco during conditioning and processing of the tobacco prior to the tobacco being wrapped to form individual aerosol-forming articles. In those embodiments in which the aerosol-forming substrate comprises tobacco in the form of cast leaf sheets, magnetic particles having a diameter of less than about 75 micrometres can be incorporated into the cast leaf sheets without requiring an increase in the typical thickness of such sheets. Using magnetic particles having a diameter of at least about 25 micrometres can prevent transfer of the magnetic articles from the aerosol-forming substrate to other parts of the aerosol-forming article or the consumer during use of the article.

Suitable magnetic materials for forming the magnetic particles include ferrites, ferrous alloys and nickel alloys.

The aerosol-forming article may comprise an aerosol-forming substrate, a hollow tubular element, an aerosol cooling element and a mouthpiece arranged sequentially in co-axial alignment and circumscribed by an outer wrapper. Where the aerosol-forming article comprises an outer wrapper, the outer wrapper, for example, may be a cigarette paper outer wrapper.

The aerosol-forming article may be between about 30 mm and about 120 mm in length, for example about 45 mm in length. The aerosol-forming article may be between about 4 mm and about 15 mm in diameter, for example about 7.2 mm. The aerosol-forming substrate may be between about 3 mm and about 30 mm in length.

As described above, the aerosol-forming article includes an aerosol-forming substrate. The aerosol-forming substrate preferably comprises a tobacco-containing material containing volatile tobacco flavour compounds which are released from the substrate upon heating. Alternatively, the aerosol-forming substrate may comprise a non-tobacco material such as those used in the devices of EP-A-1 750 788 and EP-A-1 439 876. Preferably, the aerosol-forming substrate further comprises an aerosol former. Examples of suitable aerosol formers are glycerine and propylene glycol. Additional examples of potentially suitable aerosol formers are described in EP-A-0 277 519 and U.S. Pat. No. 5,396,911. The aerosol-forming substrate may be a solid substrate. The solid substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco and expanded tobacco. Optionally, the solid substrate may contain additional tobacco or non-tobacco volatile flavour compounds, to be released upon heating of the substrate.

Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, such as those disclosed in U.S. Pat. Nos. 5,505,214, 5,591,368 and 5,388,594, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix. The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavour delivery during use. Alternatively, the carrier may be a non-woven fabric or fibre bundle into which tobacco components have been incorporated, such as that described in EP-A-0 857 431. The non-woven fabric or fibre bundle may comprise, for example, carbon fibres, natural cellulose fibres, or cellulose derivative fibres.

The aerosol-forming substrate may be a liquid substrate and the smoking article may comprise means for retaining the liquid substrate. For example, the smoking article may comprise a container, such as that described in EP-A-0 893 071. Alternatively or in addition, the smoking article may comprise a porous carrier material, into which the liquid substrate may be absorbed, as described in WO-A-2007/024130, WO-A-2007/066374, EP-A-1 736 062, WO-A-2007/131449 and WO-A-2007/131450. The aerosol-forming substrate may alternatively be any other sort of substrate, for example, a gas substrate, or any combination of the various types of substrate. The magnetic particles may be incorporated into the means for retaining the liquid substrate, for example within the material forming the container for retaining the liquid substrate. Alternatively or in addition, where present, the magnetic particles may be incorporated into the porous carrier material.

The aerosol-forming article is preferably a smoking article.

According to a further aspect, the present invention provides an electrically heated aerosol-generating device for receiving an aerosol-forming article comprising a magnetic material, the device comprising a heater element for heating an aerosol-forming article, and an inductor. The device further comprises a controller for measuring an inductance of the inductor and for controlling a supply of electrical current to the heater element in response to the measured inductance.

Advantageously, the aerosol-generating device according to the present invention can detect the presence of a magnetic material in an aerosol-forming article inserted into the device and control the electrical current to the heater element accordingly. In particular, by detecting changes in the inductance of the inductor as a result of the magnetic material in the aerosol-forming article being placed proximate the inductor, the controller can determine that an aerosol-forming article intended for use with the device has been inserted.

Controlling the electrical current to the heater element may include switching the current on, switching the current off and otherwise modulating the current supply. For example, upon detecting the presence of a magnetic material, such as the magnetic particles in the aerosol-forming articles described above, the controller may activate a supply of electrical current to the heater element to begin heating the aerosol-forming article.

As described above, the controller may be configured to distinguish between different types of aerosol-forming article. For example, based on the measured inductance of the inductor when an aerosol-forming article is inserted, the controller may determine the amount of magnetic material present and therefore the type of aerosol-forming article.

Additionally, or alternatively, by repeatedly measuring the inductance of the inductor during heating of the aerosol-forming article, the controller may determine the temperature at which a significant change in inductance occurs, which indicates the Curie temperature of the magnetic material in the aerosol-forming article. Based on the determined Curie temperature, the controller can determine the type of aerosol-forming article.

In response to determining the type of aerosol-forming article, the controller can modulate the supply of electrical current to the heater element accordingly. For example, based on the type of aerosol-forming article, the controller can modulate the current to provide a particular heating profile that is appropriate for the type of aerosol-forming article.

The heater element preferably comprises an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum and metals from the platinum group. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, TIMETAL® and iron-manganese-aluminium based alloys. In composite materials, the electrically resistive material may optionally be embedded in, encapsulated or coated with an insulating material or vice-versa, depending on the kinetics of energy transfer and the external physicochemical properties required. Examples of suitable composite heater elements are disclosed in U.S. Pat. No. 5,498,855, WO-A-03/095688 and U.S. Pat. No. 5,514,630.

The heater element may take any suitable form. For example, the heater element may take the form of a heating blade, such as those described in U.S. Pat. Nos. 5,388,594, 5,591,368 and 5,505,214. Alternatively, the heater element may take the form of a casing or substrate having different electro-conductive portions, as described in EP-A-1 128 741, or an electrically resistive metallic tube, as described in WO-A-2007/066374. Alternatively, one or more heating needles or rods that run through the centre of the aerosol-forming substrate, as described in KR-A-100636287 and JP-A-2006320286, may also be suitable. Alternatively, the heater element may be a disk (end) heater or a combination of a disk heater with heating needles or rods. Other alternatives include a heating wire or filament, for example a Ni—Cr, platinum, tungsten or alloy wire, such as those described in EP-A-1 736 065, or a heating plate.

The heater element may heat the aerosol-forming article by means of conduction. The heater element may be at least partially in contact with the aerosol-forming substrate, or the carrier on which the substrate is deposited. Alternatively, the heat from the heater element may be conducted to the substrate by means of a heat conductive element. Alternatively, the heater element may transfer heat to the incoming ambient air that is drawn through the electrically heated aerosol-generating device during use, which in turn heats the aerosol-forming article by convection. The ambient air may be heated before passing through the aerosol-forming substrate, as described in WO-A-2007/066374.

The inductor may comprise a conductive coil connected to the controller to allow the controller to measure the inductance of the inductor. The inductor is preferably arranged within the device so that the magnetic material in an aerosol-forming article is positioned proximate the inductor when the article is inserted into the device.

Preferably, the device comprises a conductive coil that functions both as the heater element and the inductor. For example, the device may comprise a heater blade comprising a conductive coil embedded in an electrically non-conductive substrate, wherein the conductive coil functions as an inductor and a resistive heating element. Forming the heater element and the inductor from a single conductive coil is cost effective and simplifies the manufacture and construction of the device.

In those embodiments in which the device comprises a single conductive coil that functions as both the heater element and the conductor, the controller is preferably configured to pulse the supply of electrical current through the conductive coil to heat an aerosol-forming article and measure the inductance of the conductive coil between current pulses. The controller may be configured to pulse the supply of electrical current through the conductive coil at a frequency of between about 1 MHz and about 30 MHz, preferably between about 1 MHz and about 10 MHz, more preferably between about 5 MHz and about 7 MHz.

According to a further aspect, the present invention provides an electrically heated aerosol-generating system comprising an electrically heated aerosol-generating device in accordance with any of the embodiments described above in combination with an aerosol-forming article in accordance with any of the embodiments described above.

According to a yet further aspect, the present invention provides a method of operating an electrically heated aerosol-generating system, the system comprising an aerosol-forming article, a heater element for heating the aerosol-forming article, an inductor, and a controller configured to measure the inductance of the inductor and to control a supply of electrical current to the heater element. The method comprises the steps of measuring an inductance of the inductor and comparing the measured inductance with one or more predetermined values of inductance. The supply of electrical current to the heater element is controlled based on the comparison of the measured inductance with the one or more predetermined values of inductance.

For example, if the measured inductance corresponds to a baseline inductance, the controller may assume that either no aerosol-forming article is present in the device, or an inserted aerosol-forming article does not comprise a magnetic material and is therefore not designed for use with the device. Under these circumstances, the controller may be configured to prevent the supply of electrical current to the heater element. That is, the controller will not activate the heater element. Therefore, the step of controlling the supply of electrical current to the heater element preferably comprises supplying no current to the heater element if the measured inductance does not match any of the one or more predetermined values of inductance, wherein the one or more predetermined values of inductance each corresponds to a type of aerosol-forming article designed for use with the device.

Alternatively, if the measured inductance is significantly different to a baseline inductance, the controller may assume that an aerosol-forming article designed for use with the device has been inserted. In this case, the controller may switch on the supply of electrical current to the heater element to begin heating the aerosol-forming article.

If the device can be used with different types of aerosol-forming article, the one or more predetermined values of inductance may comprise a plurality of predetermined values of inductance, wherein each predetermined value of inductance corresponds to a type of aerosol-forming article. In this case, the step of controlling the supply of electrical current to the heater element may comprise varying the current supplied to the heater element to provide a predetermined heating profile, wherein the predetermined heating profile is selected based on which of the plurality of predetermined values of inductance matches the measured inductance. That is, the appropriate heating profile is selected for the type of aerosol-forming article inserted into the device. For example, the different types of aerosol-forming article may comprise different amounts of magnetic material, such as different amounts of magnetic particles, as described above. In this case, the predetermined values of inductance each correspond to the inductance of the inductor when positioned proximate the corresponding amount of magnetic material.

Additionally, or alternatively, the device may be designed to function with different types of aerosol-forming article each comprising magnetic material having a different Curie temperature, such as different types of magnetic particles as described above. In such embodiments, the step of controlling the supply of electrical current to the heater element comprises activating the supply of current to the heater element to heat the aerosol-forming article to a temperature above the Curie temperature of the plurality of magnetic particles. In this case, the method further comprises the steps of repeatedly measuring the inductance of the inductor and the temperature of the heater element during heating of the aerosol-forming article, and determining when a decrease in the measured inductance occurs during the heating of the aerosol-forming article, the decrease in the inductance being indicative of the plurality of magnetic particles being heated to the Curie temperature. The current supplied to the heater element is then varied to provide a predetermined heating profile, wherein the predetermined heating profile is selected based on at least one of the time at which the decrease in measured inductance occurs and the heater element temperature at which the decrease in measured inductance occurs.

As described above, the electrically heated aerosol-generating device may comprise a conductive coil that forms both the heater element and the inductor. In this case, the step of activating the supply of current to the heater element to heat the aerosol-forming substrate comprises pulsing the supply of current through the conductive coil, and the step of repeatedly measuring the inductance of the inductor comprises measuring the inductance of the conductive coil between current pulses. The step of pulsing the supply of current through the conductive coil may comprise pulsing the supply of electrical current through the conductive coil at a frequency of between about 1 MHz and about 30 MHz, preferably between about 1 MHz and about 10 MHz, more preferably between about 5 MHz and about 7 MHz.

FIG. 1 shows an aerosol-forming article 10 comprising an aerosol-forming substrate 12, a hollow acetate tube 14, a polymeric filter 16, a mouthpiece 18 and an outer wrapper 20. The aerosol-forming substrate 12 comprises a plurality of ferromagnetic particles 22 distributed within a plug of tobacco 24. The mouthpiece 18 comprises a plug of cellulose acetate fibres.

Figure 2:
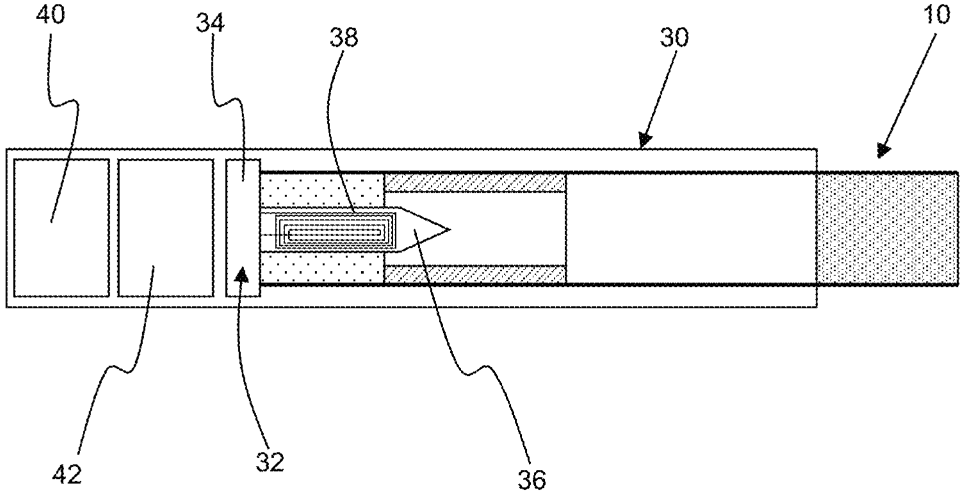
FIG. 2 shows the aerosol-forming article of FIG. 1 inserted into an electrically heated aerosol-generating device in accordance with an embodiment of the invention.

FIG. 2 shows the aerosol-forming article 10 inserted into an electrically heated aerosol-generating device 30. The device 30 includes a heater element 32 comprising a base portion 34 and a heater blade 36 that penetrates the aerosol-forming substrate 12. The heater blade 36 includes a conductive coil 38 configured to receive a supply of electrical current from a battery 40 provided within the device 30. A controller 42 controls the operation of the device 30, including the supply of electrical current from the battery 40 to the conductive coil 38 of the heater blade 36.

During use, the controller 42 determines that the aerosol-forming article 10 is suitable for use with the device 30 by detecting the change in inductance of the conductive coil 38 as a result of the ferromagnetic particles 22 in the aerosol-forming substrate 12 being positioned proximate the conductive coil 38.

After determining that the aerosol-forming article 10 can be used with the device 30, the controller 42 begins pulsing the current from the battery 40 through the conductive coil 38 to heat the aerosol-forming substrate 12. Between current pulses, the controller 42 continues to monitor the inductance of the conductive coil 38 to determine the point at which a significant change in inductance occurs. The change in inductance indicates that the ferromagnetic particles 22 have been heated to their Curie temperature. The controller determines the temperature by measuring the resistivity of the conductive coil 38 at the moment when the change in inductance occurs. Based on the Curie temperature, the controller 42 determines the type of aerosol-forming article 10 and selects the appropriate heating profile.

The invention claimed is:

1. An aerosol-forming article for an electrically heatable aerosol-generating device, the aerosol-forming article comprising:

a mouthpiece;

an aerosol-forming substrate disposed in coaxial alignment with the mouthpiece;

a plurality of magnetic particles comprising a magnetic material having a Curie temperature of between 60 degrees Celsius and 200 degrees Celsius; and an outer wrapper, wherein the plurality of magnetic particles are provided in the outer wrapper, wherein the outer wrapper circumscribes at least the mouthpiece and the aerosol-forming substrate; or a filter, wherein the plurality of magnetic particles are provided in the filter, wherein the filter is disposed between the mouthpiece and the aerosol-forming substrate.

2. The aerosol-forming article according to claim 1, wherein the magnetic particles are substantially homogeneously distributed throughout the outer wrapper or the filter.

3. The aerosol-forming article according to claim 1, wherein the plurality of magnetic particles are present in an amount of between 1 percent and 30 percent by weight of the outer wrapper or the filter.

4. The aerosol-forming article according to claim 1, wherein the plurality of magnetic particles are present in an amount between about 1 percent and about 5 percent by weight of the outer wrapper or the filter.

5. The aerosol-forming article according to claim 1, wherein a number average diameter of the magnetic particles is between 25 micrometres and 75 micrometres.

6. The aerosol-forming article according to claim 1, wherein the plurality of magnetic particles comprise a magnetic material having a Curie temperature of at least about 70 degrees Celsius.

7. The aerosol-forming article according to claim 1, wherein the plurality of magnetic particles comprise a magnetic material having a Curie temperature of less than about 140 degrees Celsius.

8. The aerosol-forming article according to claim 1, wherein the plurality of magnetic particles comprises ferrite, a ferrous alloy, or a nickel alloy material.

9. The aerosol-forming article according to claim 1, wherein the aerosol-forming article is between about 30 mm and about 120 mm in length.

10. The aerosol-forming article according to claim 1, wherein the aerosol-forming article is between about 4 mm and about 15 mm in diameter.

11. A plurality of aerosol-forming articles for an electrically heatable aerosol-generating device, each aerosol-generating article of the plurality of aerosol-forming articles being according to claim 1.

12. The plurality of aerosol-forming articles according to claim 11, wherein each aerosol-forming article has a different type of magnetic particle to enable the aerosol-generating device to distinguish between aerosol-forming articles.

13. The plurality of aerosol-forming articles according to claim 12, wherein each type of magnetic particle has a different Curie temperature.

14. The plurality of aerosol-forming articles according to claim 11, wherein said each aerosol-forming article comprises a different amount of magnetic particles.

* * * * *